(12) United States Patent
Cichonski

(10) Patent No.: US 10,451,308 B2
(45) Date of Patent: Oct. 22, 2019

(54) SYSTEM AND METHOD FOR REDUCING ENERGY CONSUMPTION BY A MEDIUM HEATING DEVICE

(71) Applicant: ADVANCED DIGITAL BROADCAST S.A., Chambesy (CH)

(72) Inventor: Dariusz Cichonski, Zielona Gora (PL)

(73) Assignee: ADVANCED DIGITAL BROADCAST S.A., Chambesy (CH)

( * ) Notice: Subject to any disclaimer, the term of this patent is extended or adjusted under 35 U.S.C. 154(b) by 121 days.

(21) Appl. No.: 15/372,424

(22) Filed: Dec. 8, 2016

(65) Prior Publication Data

US 2017/0167750 A1 Jun. 15, 2017

(30) Foreign Application Priority Data

Dec. 14, 2015 (EP) ..................................... 15199804

(51) Int. Cl.
*F24H 1/00* (2006.01)
*A47L 15/00* (2006.01)
(Continued)

(52) U.S. Cl.
CPC ........ *F24H 1/0072* (2013.01); *A47L 15/0047* (2013.01); *A47L 15/0063* (2013.01); *A47L 15/0097* (2013.01); *A47L 15/4291* (2013.01); *D06F 39/006* (2013.01); *A47L 2301/04* (2013.01); *A47L 2301/08* (2013.01);
(Continued)

(58) Field of Classification Search
CPC ........ Y02B 40/54; Y02B 40/42; Y02B 40/44; Y02B 40/46; Y02B 40/52; A47L 15/0097; A47L 15/4291; A47L 15/0047; A47L 15/0063; A47L 15/4219; A47L 2301/04; A47L 2401/03; A47L 2401/06; A47L 2501/32; F24H 1/0072; F24H 1/00; F24H 1/10; D06F 39/006
See application file for complete search history.

(56) References Cited

U.S. PATENT DOCUMENTS 4,507,933 A * 4/1985 Chapa ................. A47L 15/0097
62/184
5,301,745 A * 4/1994 Seib ..................... F24D 17/001
165/119

(Continued)

FOREIGN PATENT DOCUMENTS

EP 2196126 A1 * 6/2010 ......... A47L 15/0097

*Primary Examiner* — Steven S Anderson, II
(74) *Attorney, Agent, or Firm* — Mark M. Friedman

(57) ABSTRACT

A method for reducing energy consumption by a medium heating device, the method comprising the step: scheduling an operation (501) of the first device (111) requiring heating of a first medium; scheduling an operation (502) of the second device (112) requiring heating of a second medium; the method being characterized in that it further comprises the steps of: sending (504), from the first device (111), information regarding its operation cycles and water parameters to the second device (112); rescheduling (505) operations of the liaised devices (111, 112) so that drain heat of the first medium is reused to heat a fresh intake of the second medium by the second device by means of a heat exchanger (160); instructing (506), the reprogrammed devices (111, 112) to start their operations according to the new schedule.

8 Claims, 7 Drawing Sheets

(51) Int. Cl.
*A47L 15/42* (2006.01)
*D06F 39/00* (2006.01)
*D06F 33/02* (2006.01)

(52) U.S. Cl.
CPC ....... *A47L 2401/03* (2013.01); *A47L 2401/06* (2013.01); *A47L 2401/12* (2013.01); *A47L 2501/32* (2013.01); *A47L 2501/36* (2013.01); *D06F 33/02* (2013.01); *D06F 2204/04* (2013.01); *D06F 2204/08* (2013.01); *D06F 2204/088* (2013.01); *D06F 2210/00* (2013.01); *Y02B 40/44* (2013.01); *Y02B 40/54* (2013.01)

(56) References Cited

U.S. PATENT DOCUMENTS

| | | | |
|---|---|---|---|
| 2010/0024844 A1* | 2/2010 | Brunswick | A47L 15/4291 134/10 |
| 2012/0095606 A1* | 4/2012 | Besore | A47L 15/0047 700/291 |
| 2014/0020559 A1* | 1/2014 | Meirav | B01D 53/0438 95/148 |

* cited by examiner

SYSTEM AND METHOD FOR REDUCING ENERGY CONSUMPTION BY A MEDIUM HEATING DEVICE

TECHNICAL FIELD

The present invention relates to a system and method for reducing energy consumption by a medium heating device. Said heating medium may be solid or fluid (such as water, steam, air, or flue gas) which is used to convey heat from a heat source (such as a boiler furnace), either directly or through a suitable heating device, to a substance or space being heated. In the present invention, the heating medium will typically be a fluid such as water, glycol or the like while the medium heating device will typically be a dishwasher, a washing machine, a boiler or the like. In particular the present invention relates to drain water heat reuse.

The present invention relates also to the growing ever more popular concept of the Internet of Things (IoT). The IoT is the network of physical objects or "things" embedded with electronics, software, sensors, and network connectivity, which enables these objects to collect and exchange data. The IoT allows objects to be sensed and controlled remotely across existing network infrastructure, creating opportunities for more direct integration between the physical world and computer-based systems, and resulting in improved efficiency, accuracy and economic benefit (source: Wikipedia).

BACKGROUND OF THE INVENTION

Prior art defines US2010/0024844(A1) entitled "Warewasher with water energy recovery system" that discloses a warewash machine including a housing at least in part defining a chamber for cleaning wares. A sump collects hot cleaning water that is recirculated in the chamber during cleaning. A drain line is for draining cleaning water from the sump. A fresh water input system includes at least a hot water input that receives hot water from a hot water source and a cold water input that receives cold water from a cold water source. The fresh water input system has a common input line in communication with the hot water input and the cold water input. A cold water input valve is for controlling input of cold water into the common input line. A hot water input valve is for controlling input of hot water into the common input line. The drain line and the common input line are arranged in a heat exchange relationship to enable heat from cleaning water traveling through the drain line to enable transfer of heat to water traveling through the common input line. A temperature sensor arrangement is associated with the drain line for determining temperature of the cleaning water traveling through the drain line. A controller receives input from the temperature sensor arrangement and is operable to control the cold water input valve and the hot water input valve such that, during a draining operation, if cleaning water traveling through the drain line is above a preselected temperature, the controller opens the cold water input valve to allow water from the cold water source to enter the common input line.

The system of '844 is insufficient since it is related only to devices having multiple cycles of water heating.

Thus, first it would be advantageous to apply drain water heat reuse also in devices operating only in a single water heating cycle.

Prior art also discloses a heat exchanger, which is a device used to transfer heat between one or more fluids. The fluids may be separated by a solid wall to prevent mixing or they may be in direct contact. They are widely used in space heating, refrigeration, air conditioning, power stations, chemical plants, petrochemical plants, petroleum refineries, natural-gas processing, and sewage treatment. The classic example of a heat exchanger is found in an internal combustion engine in which a circulating fluid known as engine coolant flows through radiator coils and air flows past the coils, which cools the coolant and heats the incoming air [source: Wikipedia].

There exist different concepts of waste heat recovery units or in particular drain water heat recovery unit. Such units may be recuperators, heat pumps, run around coils and many more.

A publication of WO2013143576, entitled "Washing machine and method of operating a washing machine" discloses that in a washing machine comprising a washing tub (10) for accommodating articles to be cleaned, a water-softening device comprising an ion exchanger (30) through which fresh water can be fed before being passed to the washing tub (10), and a drain line (22; 42) for removing water from the tub (10), it is suggested that the dishwasher further comprises means (32, 34, 36; 48; 54) for providing for an indirect heat-exchange between said ion exchanger (30) and said drain line (22; 42). Further, a method of operating a washing machine is suggested, which method comprises: (A) passing water via a water-softening device comprising an ion exchanger to a washing tub; (B) heating water that is passed to the washing tub either before or after it enters the washing tub; (C) removing heated water from the washing tub; and (D) providing for an indirect heat-exchange between heated water which has been removed from the washing tub and water that is passed to the washing tub via the water-softening device.

A drawback of this system is that drain water heat present after the last operating cycle of the dishwasher is lost.

Therefore, secondly it would be advantageous to apply drain water heat reuse also in case of a final drain of a given operating cycle of a machine such as a dishwasher.

The aim of the development of the present invention is an improved and cost effective a system and method for reducing energy consumption by a medium heating device.

SUMMARY AND OBJECTS OF THE PRESENT INVENTION

An object of the present invention is a method for reducing energy consumption by a medium heating device, the method comprising the step: scheduling an operation of a first device requiring heating of a first medium; scheduling an operation of a second device requiring heating of a second medium; the method being characterized in that it further comprises the steps of: sending, from the first device, information regarding its operation cycles and water parameters to the second device; rescheduling operations of the liaised devices so that drain heat of the first medium is reused to heat a fresh intake of the second medium by the second device by means of a heat exchanger: instructing, the reprogrammed devices to start their operations according to the new schedule.

Preferably, the first medium and the second medium are the same or different.

Preferably, there are scheduled operations of other devices requiring heating of a medium prior to executing the sending step wherein the devices select one of them as a master that will control scheduling of actions of all devices.

Preferably, during the rescheduling step operation cycles, water parameters are taken into account.

Preferably, the operations cycles identify at least when a given device drains or takes in the heat transmitting medium and heating medium parameters identify at least temperature of drain medium.

Preferably, the rescheduling step takes into account: when a first device will be draining water and when another device is preferably started so that intake water, after passing the heat exchanger, is immediately used; and temperature parameters of drain water of a first device and operating temperature of water of the second device.

Preferably, the rescheduling step takes into account preferences identifying that a given device has a priority over another Another object of the present invention is a computer program comprising program code means for performing all the steps of the computer-implemented method according to the present invention when said program is run on a computer.

Another object of the present invention is a computer readable medium storing computer-executable instructions performing all the steps of the computer-implemented method according to the present invention when executed on a computer.

Further, object of the present invention is a system for reducing energy consumption by a medium heating device, the system comprising: a first device requiring heating of a first medium and having a scheduled operation; a second device requiring heating of a second medium and having a scheduled operation; the system being characterized in that it further comprises: a heat exchanger wherein the first and the second device comprises a drain line arranged in a heat exchange relationship with an input line of a medium to be heated, in order to enable heat from the first or second medium traveling through the drain line to transfer heat to the medium to be heated traveling through the input line; a communication means configured to enable the first and the second device to agree on a time of heat exchange, between the first and the second device, via the heat exchanger.

Preferably, the system comprises a storage tank, present together with the heat exchanger, that receives the medium to be heated from the input line once heated by drain medium traveling through the drain line.

BRIEF DESCRIPTION OF THE DRAWINGS

These and other objects of the invention presented herein, are accomplished by providing a system and method for reducing energy consumption by a medium heating device. Further details and features of the present invention, its nature and various advantages will become more apparent from the following detailed description of the preferred embodiments shown in a drawing, in which.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

As utilized herein, the term "example" means serving as a non-limiting example, instance, or illustration. As utilized herein, the terms "for example" and "e.g." introduce a list of one or more non-limiting examples, instances, or illustrations.

DESCRIPTION OF EMBODIMENTS

Figure 1:
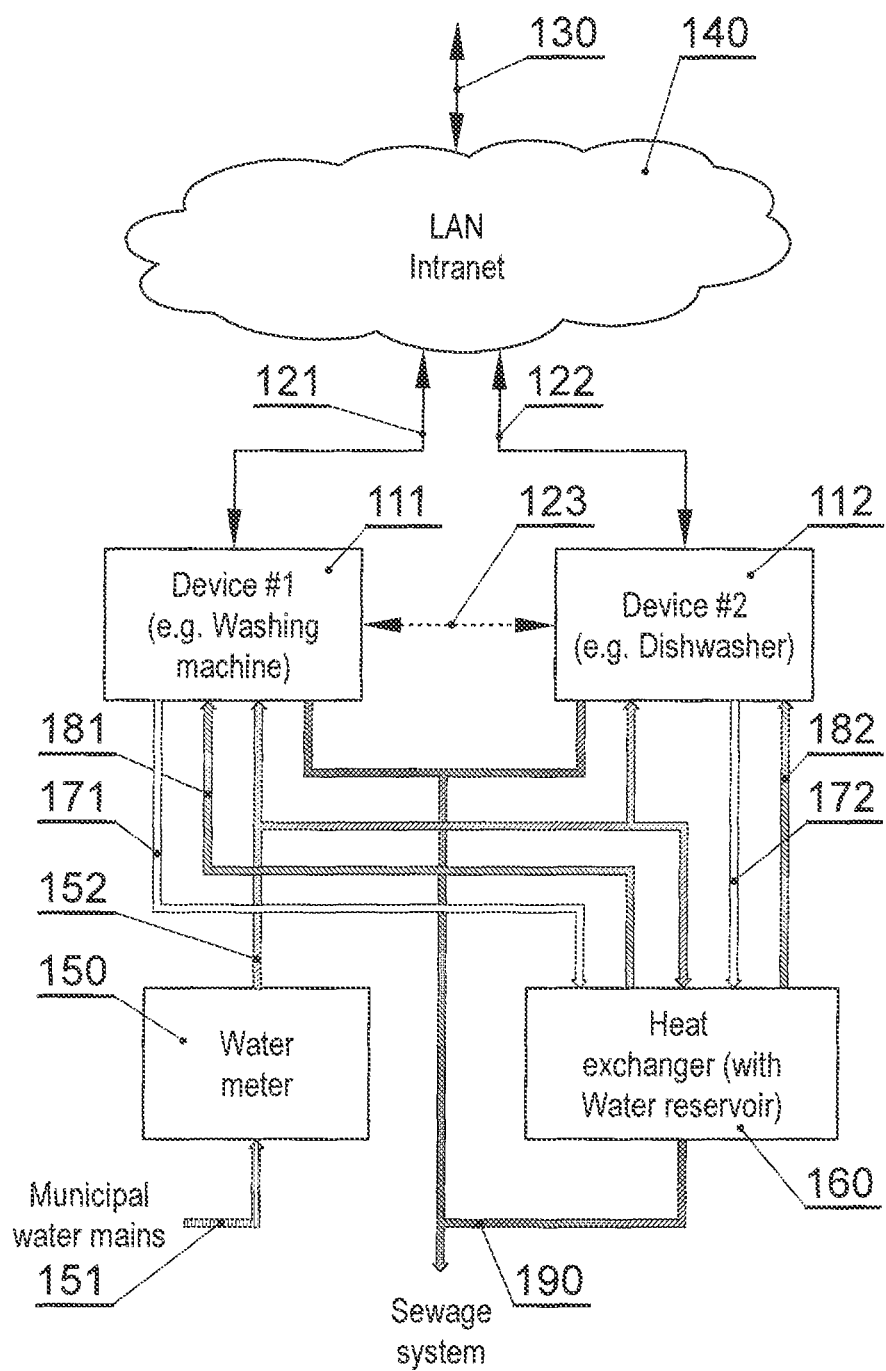
FIG. 1 presents a diagram of a general overview of the system according to the present invention.

FIG. 1 presents a diagram of a general overview of the system according to the present invention. There are at least two devices (111, 112), which during operation heat a given medium (e.g. water) received from a suitable input (152). The given medium may be supplied from municipal water mains (151) and typically will pass via an appropriate meter (150). The input water is also supplied to a heat exchanger (160).

Each of the devices (111, 112) comprises a drain line (171, 172) arranged in a heat exchange relationship with the common input line (152), in order to enable heat from water traveling through the drain line (171, 172) to transfer heat to water traveling through the common input line (152). A suitable heat exchanger (160) may be used for that purpose that comprises and output drain line (190).

A storage tank may be present together with the heat exchanger (160) that receives water from the common input line (152) once heated by drain water traveling through the drain line. The tank may be useful when there are expected longer periods of time between water drain from a first device (111) and water intake by a second device (112).

In case the heat exchanger (160) is positioned higher than the devices (111, 112), a suitable pump may be used to pass the drain water from the devices (111, 112) to the heat exchanger (160).

Each of the devices (111, 112) optionally comprises a bypass drain line (190), that may be useful when water in the tank must meet some parameters. When the parameters are met at a given time, additional drain water would change then and in such case the bypass drain line (190) may be used not to alter the tank water parameters.

Each of the devices (111, 112) also comprises water intake (181, 182) from the heat exchanger (160). Optionally, the common input line (152) may only be connected to the heat exchanger (160) while the devices (111, 112) only take water in from the heat exchanger (160) and lines (181, 182) respectively.

In this arrangement, the first device may supply heated drain water to the heat exchanger (160) while the second device will take input water from the heat exchanger (160). In this manner the water from the municipal water mains (151) is heated, by drain water, before being supplied to a consumer device. Because the water has higher temperature that in the municipal water mains (151), less energy consumption is required by the second device.

In order for the at least two devices (111, 112) to agree on a time of water heat exchange (be it in a system with or without a water tank) they have a communication capability (121-123). The communication may be either wired or wireless and may be direct (123) (e.g. Bluetooth) or indirect, for example via a router and a local area network (140).

Figure 2:
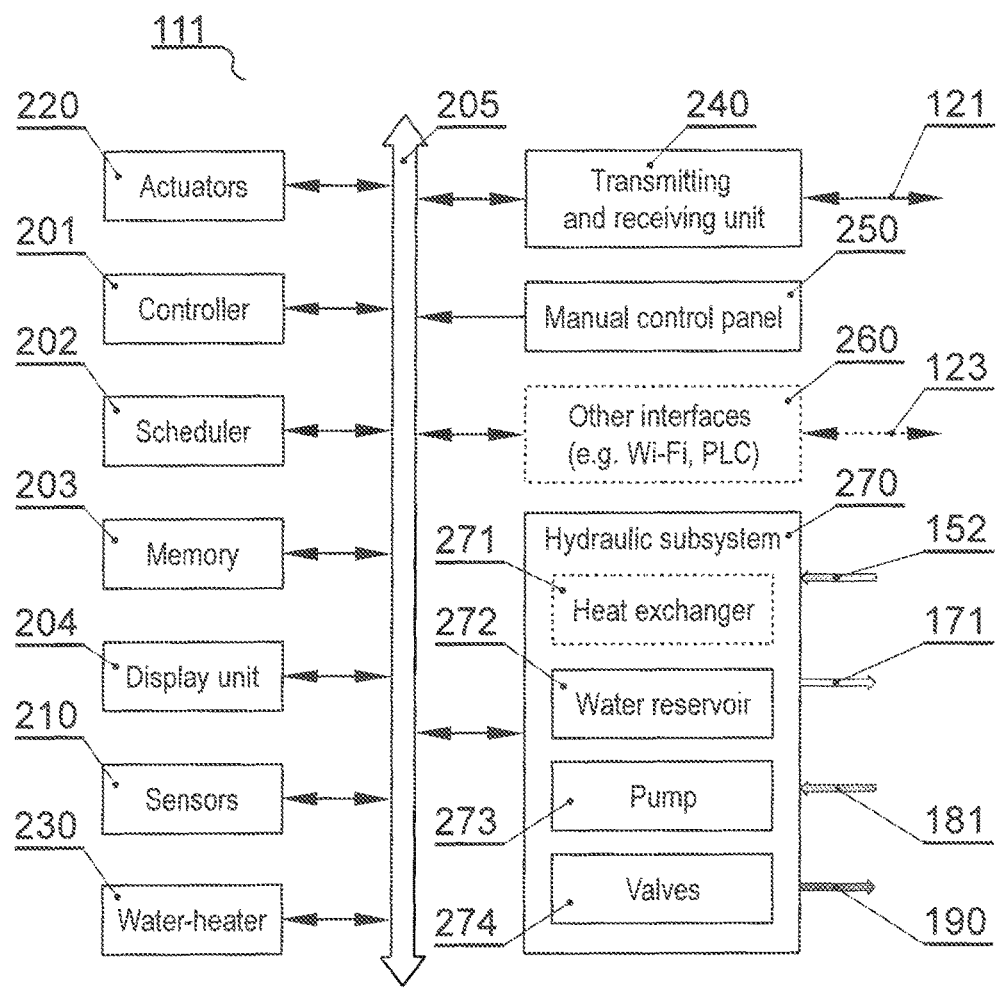
FIG. 2 presents a diagram of the device according to the present invention.

FIG. 2 presents a diagram of the device (111, 112) according to the present invention. The system, as shown, may be implemented for example in a typical dishwasher.

The system may be realized using dedicated components or custom made FPGA or ASIC circuits. The system comprises a data bus (205) communicatively coupled to a memory (203). Additionally, other components of the system are communicatively coupled to the system bus (205) so that they may be managed by a controller (201).

The memory (203) may store computer program or programs executed by the controller (201) in order to execute steps of the method according to the present invention.

The device may comprise suitable actuators (220) such as valve actuators, motors etc. Further, required sensors (210) may be present such as temperature sensor or the like.

Naturally, a water heater (230) is present, which heats the supplied water, which after a given program run is drained to a hydraulic subsystem (270). The hydraulic subsystem may comprise a suitable pump (273), one or more valves (274) and a water reservoir (272). Optionally, an internal heat exchanger (271) may be present.

As previously described, the device (111) comprises direct (260) and/or indirect (240) communication means for communicating with other devices supporting the present invention.

A user may program the device using a manual control panel (250) or any other suitable control means such as remote control. In order to present its status to the user, the device may comprise a display unit (204).

Lastly, the device (111) comprises a scheduler (202) responsible for setting up operating schedules taking into account an operating schedule of at least one other device (112). For example, when scheduling operation of a first device a time of water drain is determined when another device may intake water heated by the drained water. This second device configures itself so that its program runs so as to take, at appropriate time, the water heated by the drained water. This makes the heat exchange most efficient and may obviate a need for a water tank coupled to the heat exchanger (160).

Figure 3:
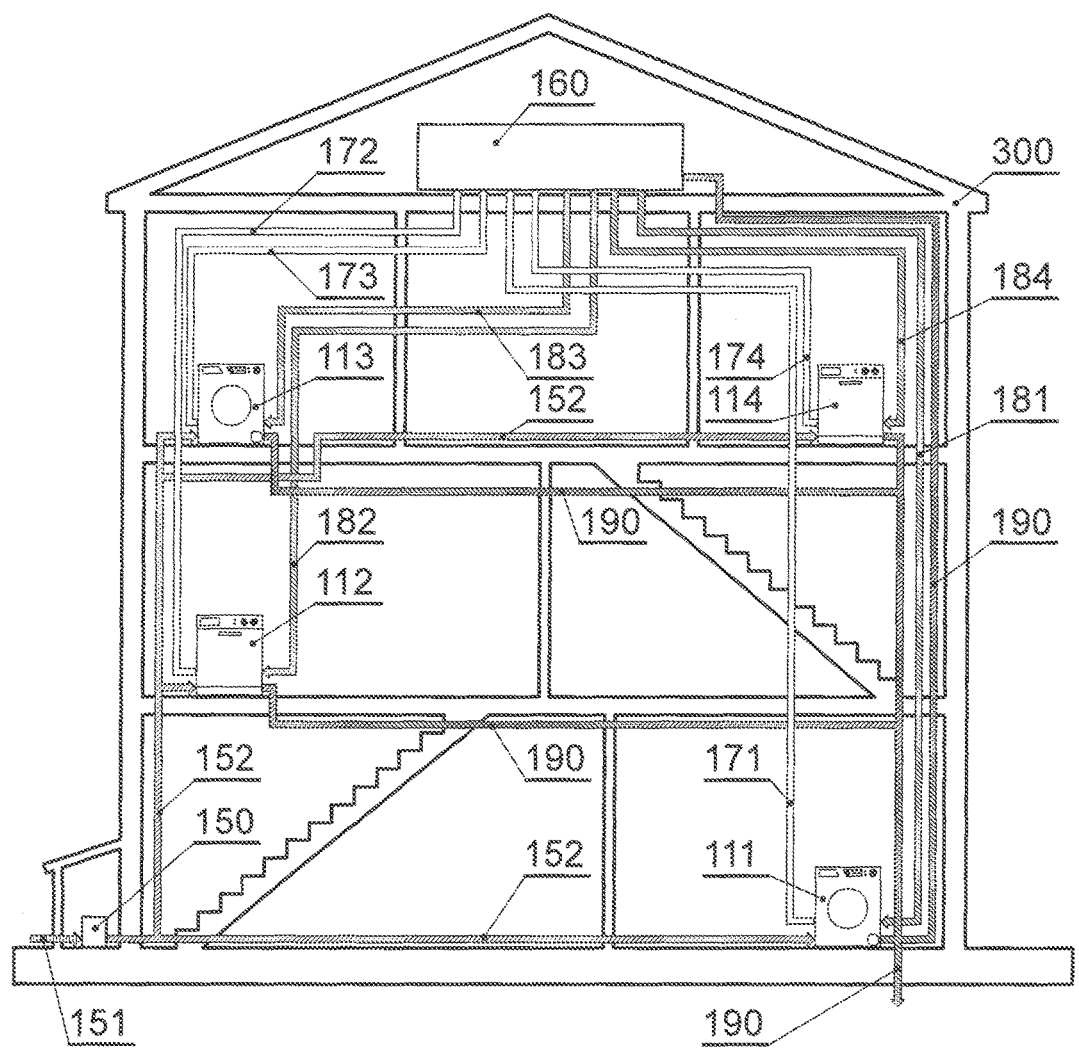
FIG. 3 presents a house comprising a plurality of devices according to the present invention connected to a shared heat exchanger.

FIG. 3 presents a house comprising a plurality of devices (111, 112, 113, 114) according to the present invention connected to a shared heat exchanger (160). Accordingly, the heat exchanger (160) has four drain water inputs (171-174) and four heated water outputs (181-184) respectively as well as a common waste water output (190).

Figure 4A:
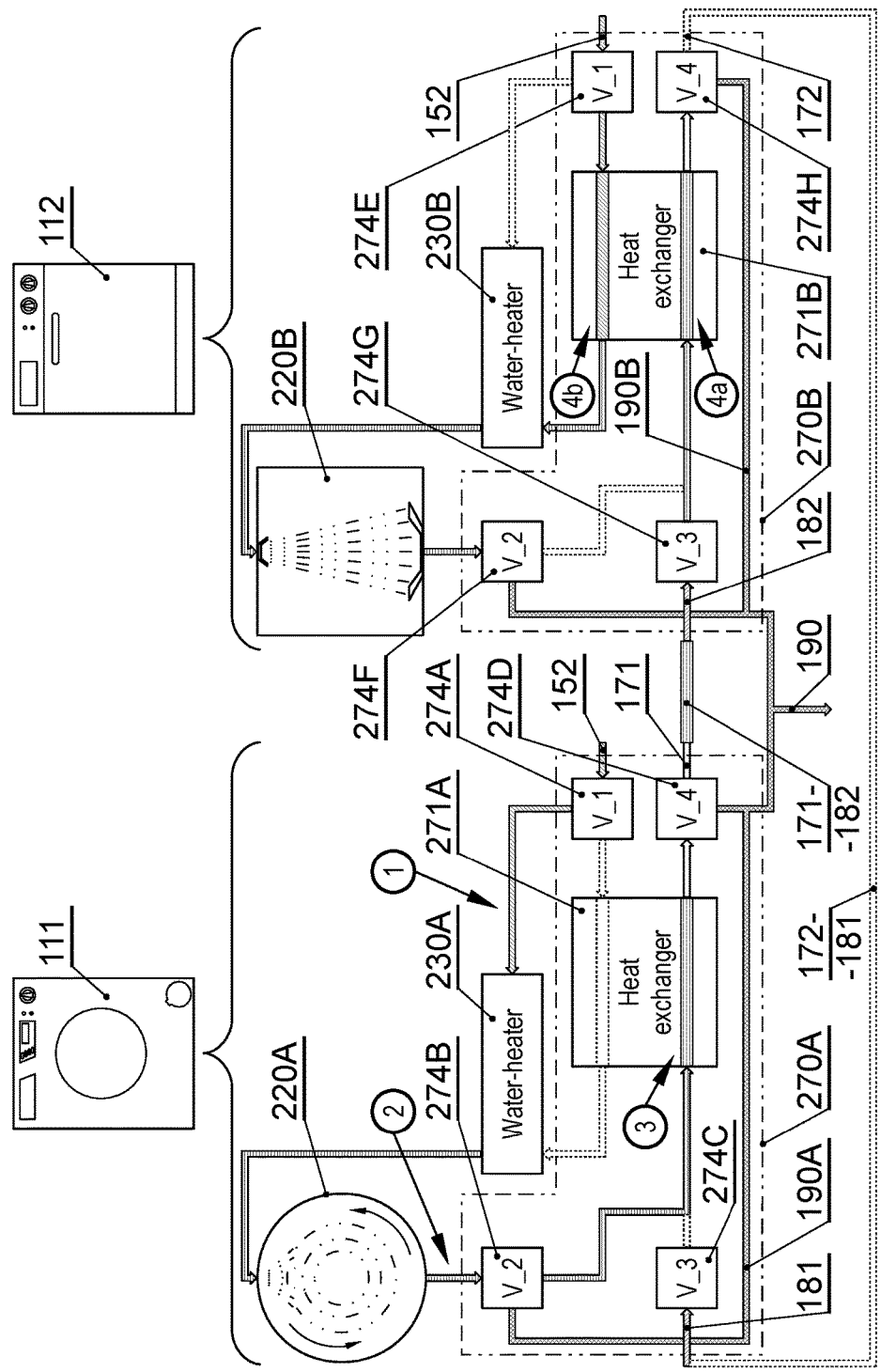
FIGS. 4A-B present cooperation of two devices in an embodiment where at least one of the devices comprises an internal heat exchanger.
Figure 4B:
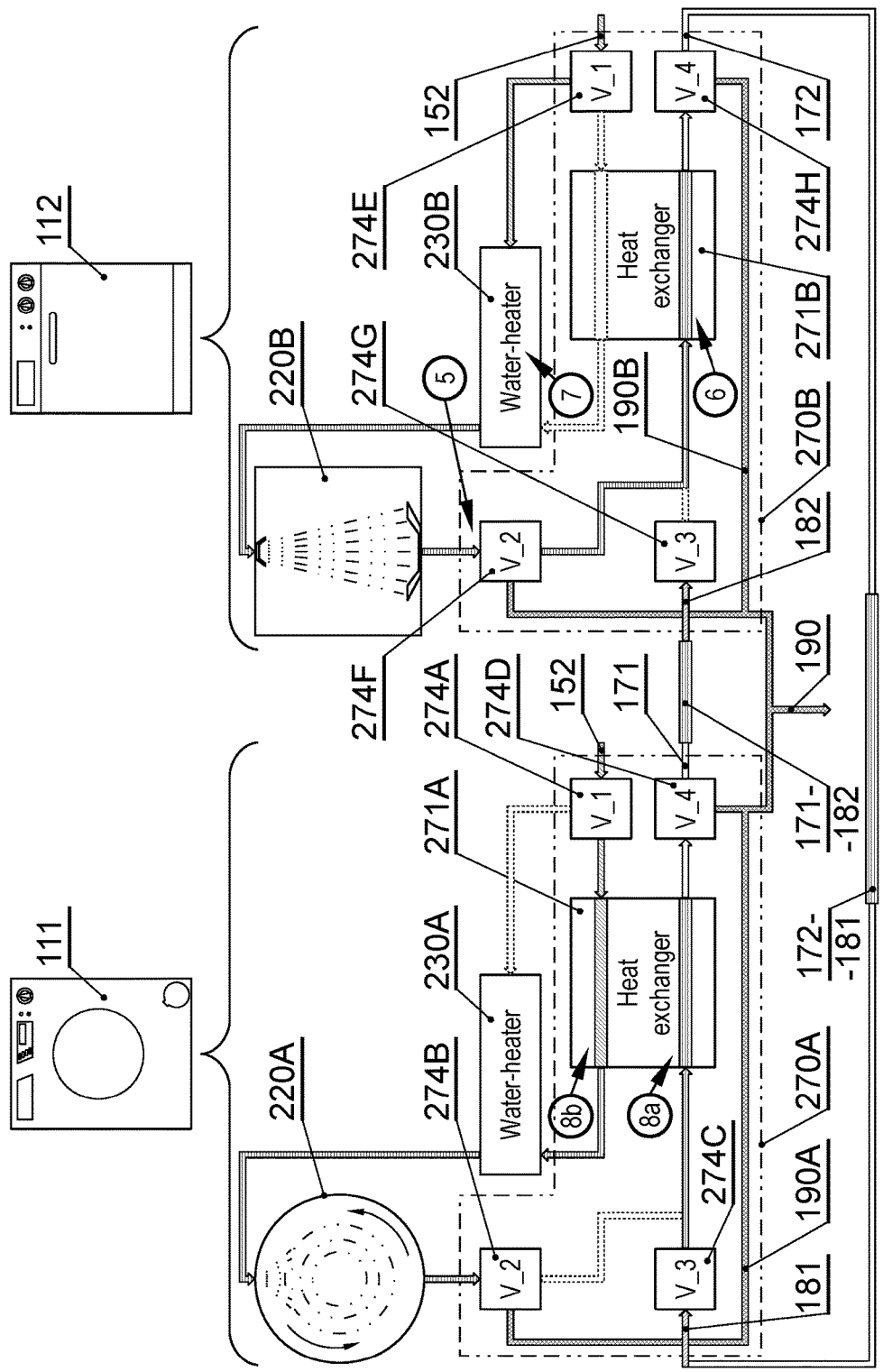

FIGS. 4A-B present cooperation of two devices (111, 112) in an embodiment where at least one of the devices (111, 112) comprises an internal heat exchanger. The first device (111) is for example a washing machine taking water from the input (152). This water is controlled by a valve V_1 (274A) which controls whether drain water (190A) is reused by the device itself (111) or whether fresh water is to be supplied directly to a water heater (230A). In the first case, the fresh water flows into the heat exchanger (271A) and subsequently, the water heated in the heat exchanger (271A) may also pass via the water heater (230A) so that it may be additionally heated when required.

Next, the heated water is used as required (2) in step (220A) and drain water is passed to a valve (V_2) (274B) which controls whether to pass the drain water to the heat exchanger (271A) or directly (190A) to sewage output (190). The heat exchanger (271A) may also be selectively supplied with drain water (181) of the second device (112) by means of a valve (V_3) (274C).

The device (112), a dishwasher, is presented for illustrative purposes only. It comprises the same elements as described with respect to the first device (111) renumbered respectively. The valve (V_4) (274D) may direct the drain water (190A) to the second heat exchanger (271B).

In case of FIG. 4A the second device heats water using the drain water from the first device while in FIG. 4B the situation is reversed accordingly.

Figure 5:
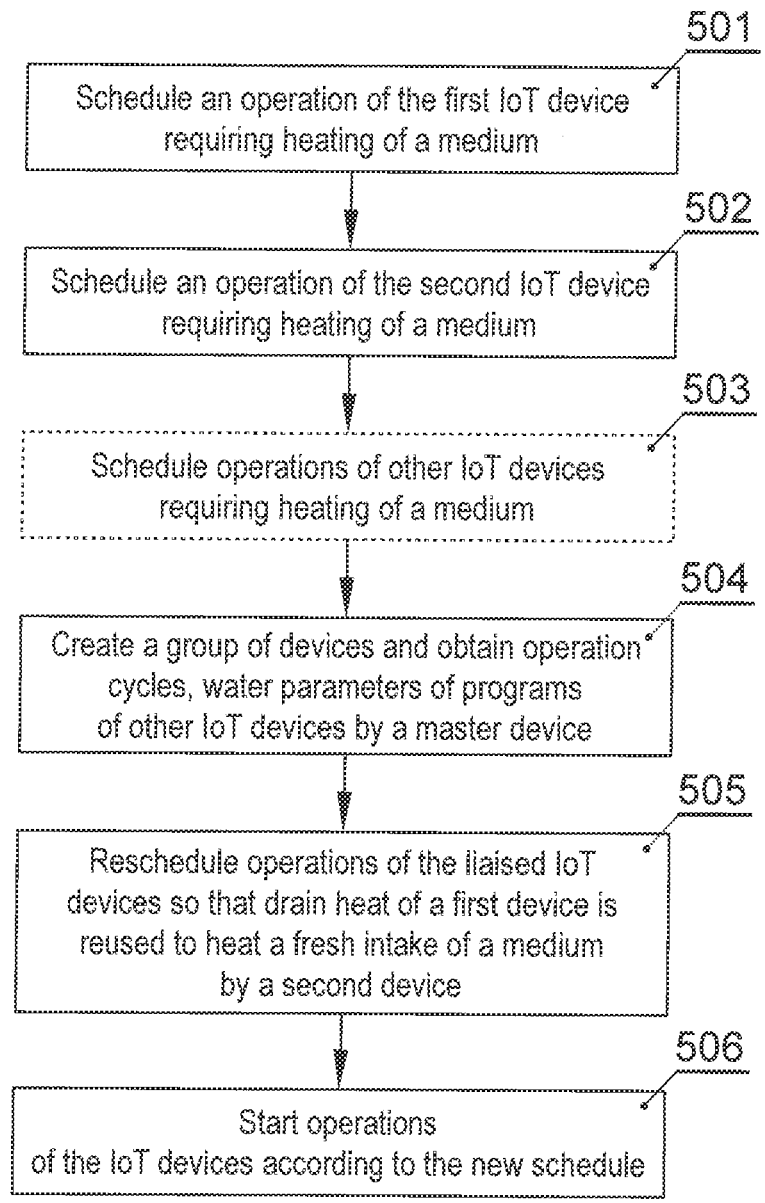
FIG. 5 presents method according to the present invention.

FIG. 5 presents the method according to the present invention. The process starts from scheduling an operation of the first IoT device (501) requiring heating of a medium. Such scheduling may be a selection of an operating program by a user, preferably using the manual control panel (250). For example, the user selects a 60-minute washing program at 60 degrees Celsius.

Subsequently, at step (502), there is scheduled an operation of the second IoT device requiring heating of a medium (the medium may be the same or different). For example, a user selects a 90 minute dishwashing program at 70 degrees Celsius.

Next, at step (503), there may optionally be scheduled operations of other IoT devices requiring heating of a medium. The devices operating in a group may optionally use different heat transmission medium, for example some may use water while other may use other liquids. This is possible as only heat is exchanged between circuits while a medium from a first circuit does not mix with a medium from another circuit e.g. a drain water will not mix with fresh water.

Subsequently, at step (504), the first device sends information regarding its operation cycles, water parameters to the second IoT device. In such a case the second device may become a master that will control scheduling of actions of both devices (or all devices in general). In case there is a plurality of devices, the devices may select one of them as a master using appropriate communication messages known for a skilled person.

Step (505) refers to reschedule operations of the liaised IoT devices so that drain heat of a first device is reused to heat a fresh intake of a medium by a second device. During this step operation cycles, water parameters are taken into account. Operations cycles may identify at least when a given device drains or takes in water (or other heat transmitting medium), water parameters may identify at least temperature of drain or operational medium as well as amount of the intake that is needed or drained.

Different scenarios are applicable such as: checking when a first device will be draining water and when another device is preferably started so that intake water after passing the heat exchangers is preferably immediately used (In order to minimize heat loses); checking temperature parameters of drain water of a first device and operating temperature of water of the second device.

In the second case when a first device has drain water temperature of 60 degrees Celsius and drain capacity of 10 liters and a second device has drain water temperature of 50 degrees Celsius and drain capacity of 8 liters while a third device has operating water temperature of 60 degrees Celsius and water capacity of 20 liters, it may be beneficial first to heat the input water of the third device by the drain water of the second device and then heat the input water of the third device by the drain water of the first device having higher drain water temperature than the second device. Thus, appropriate rescheduling of their initially programmed operation cycles is required.

Lastly, at step (506), the reprogrammed devices start their operations according to the new schedule.

Figure 6A:
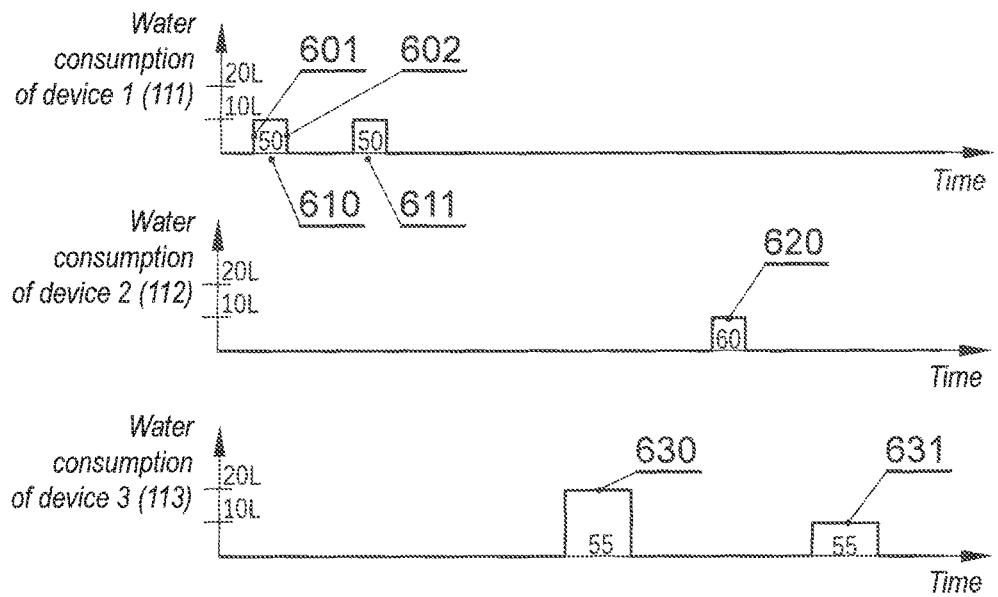
FIG. 6A-B show time diagrams of water intake and drain by three different devices operating to the method of FIG. 5.
Figure 6B:
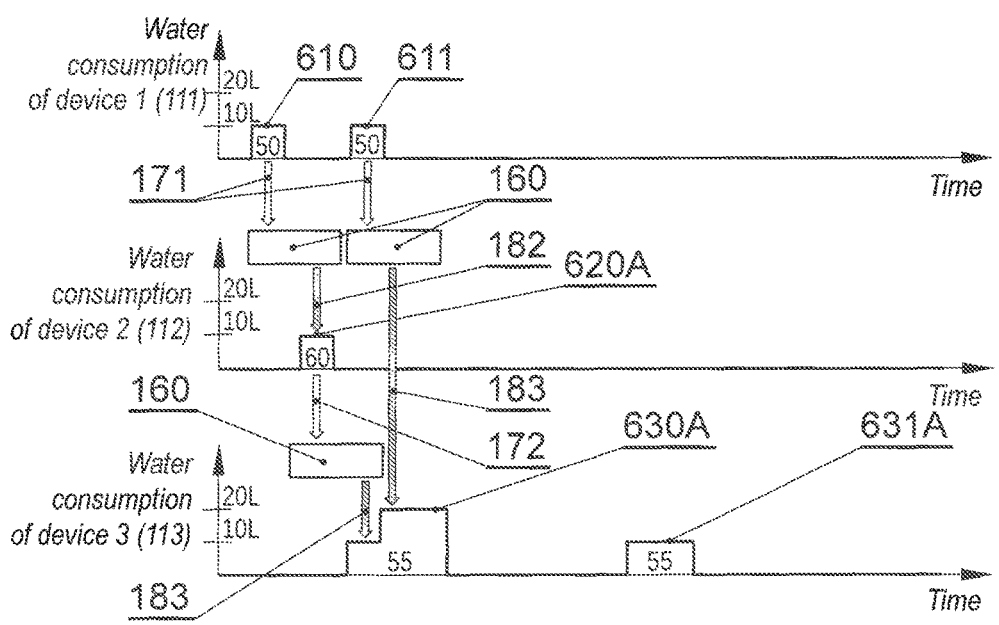

FIG. 6A-B show time diagrams of water intake and drain by three different devices operating to the method of FIG. 5. The devices (111, 112, 113) and numbering of items matches FIG. 3. A rising edge (601) denotes water intake while a falling edge denotes water drain (602)—water is herein an exemplary medium that is heated and drained.

FIG. 6A shows the first device (111) is set to an operating program, in which two water intake/drain cycles are present (610, 611). In both cycles water is heated to 50 degrees Celsius and the amount of water intake (601) is 10 liters.

The second device (112) is set to an operating program, in which one water intake/drain cycle is present (620) wherein water is heated to 60 degrees Celsius and the amount of water intake (601) is 10 liters.

The third device (113) is set to an operating program, in which two water intake/drain cycles are present (630, 631). In both cycles water is heated to 55 degrees Celsius and the amount of water intake (601) is 20 liters in the first cycle (630) and 10 liters in the second cycle (631).

Since there are five water intake steps for this group of devices (111, 112, 113), different operating schedules may be set. Some of the schedules may take into account user preferences identifying that a given device may have a priority over another. For example, a washing machine and a dishwasher may have lower priority than a shower connected (its drain) to the heat exchanger (160). In another embodiment a user may specify that a given device is not to be involved in rescheduling and that it shall run as defined by the user and not by the rescheduling system. This resembles having a device of a highest priority.

FIG. 6B presents a possible rescheduled operating cycles of the three devices (111, 112, 113) as shown in FIG. 6A. In the exemplary rescheduling it has been assumed that since the third device intakes 20 liters of water in its initial cycle, it would be beneficial to coordinate water drain from the first and the second devices, which drain 10 liters of water each, to meet the requirements. These requirements also define that requested temperature is 55 degrees Celsius, which is higher that the drain water temperature (610) of the first device (111).

The aforementioned invention reduces energy consumption by a set of devices by reusing drain water heat. Therefore, the invention provides a useful, concrete and tangible result.

The present invention has been implemented in a particular device as well as in a system comprising at least two devices. It explicitly concerns heating of a medium and thus the machine or transformation test is fulfilled and that the idea is not abstract.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may ail generally be referred to herein as a "circuit", "module" or "system".

Furthermore, the present invention may take the form of a computer program product embodied in any tangible medium of expression having computer usable program code embodied in the medium.

It can be easily recognized, by one skilled in the art, that the aforementioned method for reducing energy consumption by a medium heating device may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A method for reducing energy consumption by a medium heating device, the method comprising the step:
   scheduling an operation of a first device requiring heating of a first medium;
   scheduling an operation of a second device requiring heating of a second medium;
   the method being characterized in that it further comprises the steps of:
   sending, from the first device information regarding its operation cycles and parameters of the first medium to the second device;
   rescheduling operations of the first and second devices according to a new schedule so that heat of the first medium draining from the first device is reused in a heat exchanger to heat a fresh intake of the second medium by the second device; and instructing, the first and second devices, after the rescheduling step, to start their operations according to the new schedule.

2. The method according to claim 1 characterized in that the first medium and the second medium are the same or different.

3. The method according to claim 1 characterized in that there are scheduled operations of at least one other device requiring heating of a respective medium prior to executing the sending step wherein all the devices select one of them as a master that will control scheduling of actions of all devices.

4. The method according to claim 1 characterized in that during the rescheduling step the operation cycles and the parameters of the first medium are taken into account.

5. The method according to claim 4 characterized in that the operation cycles identify at least when the first or second device drains or takes in the medium and the parameters of the first medium identify at least a temperature of the medium when draining from the first device.

6. The method according to claim 4 characterized in that the rescheduling step takes into account:

when the first device will be draining the medium and when the second device is started so that intake medium for the second device, after passing the heat exchanger, is immediately used; and temperature parameters of the medium draining from the first device and an operating temperature of the medium of the second device.

7. The method according to claim 4 characterized in that the rescheduling step takes into account preferences identifying that a given device has a priority over another.

8. A computer readable medium storing computer-executable instructions performing all the steps of the computer-implemented method according to claim 1 when executed on a computer.

\* \* \* \* \*